United States Patent

[11] 3,573,766

[72] Inventor Frank A. Perkins, Jr.
Melbourne Village, Fla.

[21] Appl. No. 799,865
[22] Filed Feb. 17, 1969
[45] Patented Apr. 6, 1971
[73] Assignee Radiation Incorporated
Melbourne, Fla.

[54] APPARATUS AND PROCESS FOR RECORDING BINARY DATA IN COMPACT FORM
10 Claims, 3 Drawing Figs.

[52] U.S. Cl. .......... 340/174.1, 340/347
[51] Int. Cl. .......... G11b 5/02
[50] Field of Search .......... 340/174.1, 347; 178/26, 26.5

[56] References Cited

UNITED STATES PATENTS

| | | | |
|---|---|---|---|
| 3,258,749 | 6/1966 | Jenkins .......... | 340/347 |
| 3,281,806 | 10/1966 | Lawrance et al. .......... | 340/174.1 |

*Primary Examiner*—Terrell W. Fears
*Assistant Examiner*—Vincent P. Canney
*Attorney*—Donald R. Greene

ABSTRACT: Serial binary data to be recorded is divided into groups of equal numbers of bits in the order in which those bits appear in the original data format, and each group of bits is sampled in sequence to generate a symbol that distinctively represents the specific sequence of bit values in that group or the same sequence of bit values in any other group of bits. Each symbol occupies a time interval substantially equal to that occupied by a single bit in the original data format, so that by recording the symbols in sequence the entire information content of the original binary data is recorded in compact form.

INVENTOR
FRANK A. PERKINS, Jr.
BY Hurwitz, Rose & Greene
ATTORNEYS

APPARATUS AND PROCESS FOR RECORDING BINARY DATA IN COMPACT FORM

BACKGROUND OF THE INVENTION

My invention is directed generally to methods of and apparatus for recording binary data on magnetic tape, belts, drums, or discs, or on other suitable storage media.

It is common practice in the art of information or data storage to record binary data on magnetic tape, for example, in a linear manner such that each bit or item of stored data consists of one of two possible symbols. That is to say, each recorded signal is symbolic of one bit of information, and only one bit of information, although that bit may have either of two possible values, such as a 1 or a 0. A customary method of recording these two values is to magnetize small areas of the magnetic surface such that the magnetic flux at each area points in one direction if a 1 is being stored and in the opposite direction if a 0 is being stored.

While the actual method of recording each single bit of information may vary it remains the usual practice to use one symbol to designate one of the two possible values, and to use a distinct and different symbol to designate the other of the two possible values. Thus, for example, we have the so-called return-to-zero method of recording, the nonreturn-to-zero method of recording, the double pulse method of recording, and the frequency-doubling method of recording, each of which is explained in detail in basic texts on magnetic storage of information (see e.g., Richards, Digital Computer Components and Circuits, Van Nostrand 1958, Chapter 7 ), and hence need not be elaborated upon here. It is interesting to note, however, that in some of the established methods, such as the double pulse and frequency-doubling methods mentioned above, each symbol employed to designate a single bit consists of more than one separate and distinct part. In the double pulse method, as the name implies, two pulses are recorded for each bit of information. Usually, these multiple-part symbols are employed, and are of greatest utility, when the recording is performed at high bit densities since they provide more than one possibility of distinguishing a bit of information.

In most information storage systems, the signal-to-noise ratio of the overall recording and reproduction process is sufficiently large that more than two different symbols, each representative of a respective one of the two possible values of a bit of information, can be distinguished. Furthermore, if more than two different symbols can be distinguished in a given information storage system, and are in fact used in that system, then it is possible to record more than one bit of data per recorded symbol. This is the concept underlying my present invention.

It is a broad object of this invention to provide processes and apparatus for varying or modulating a parameter of a symbol suitable for representing a single item of information so that the symbol may be used to designate a plurality of distinct and different items of information by reference to the specific variation or modulation of the parameter in question.

SUMMARY OF THE INVENTION

In its basic form, my invention resides first in the conversion of serial binary data to a format consisting of sequential sets of a preselected number of bits whose distinct and different combinations constitute the total number of possible states of a set, which will govern the number of permissible variations of a signal parameter selected to designate respective ones of these states. The number of bits in a set is preselected to be equal to or greater than two, so that the number of possible combinations or states must necessarily exceed two. If the number of bits in a set is selected to be two, then the number of possible states is 2n where 2 is the base or radix of the binary system and *n* is the number of bit positions (or simply the number of bits), here equal to 2, making the number of possible states equal to 4.

Second, each distinct and different set of bits, i.e., each state, is employed to modulate an electrical signal parameter such that the parameter has a number of values corresponding to the total number of possible states of the set of bits, each value uniquely identifying a state. In other words, a different symbol is selectively assigned to each state or combination of bits of the set, and since the number of possible states exceeds two, the number of symbols also exceeds two. As previously observed, by using what constitutes an alphabet containing more than two symbols, more than one bit of data can be recorded per recorded symbol. More precisely, the number of bits in a set can be recorded for each recorded symbol, each distinct and different symbol representing a unique combination of bits within a set.

Finally, the symbols are recorded in the sequence in which they are derived, corresponding to the order in which the sets of bits are produced during the conversion step.

If the original data is grouped in pairs of bits (i.e., a set of bits constitutes two successive bits in the data stream), the number of possible states is 4 and four different symbols are required to express all of these combinations. Although in this example the number of different symbols is twice that employed for linear binary data recording, the bit rate is twice the symbol rate, i.e., each symbol designates a particular combination of two bits. As the grouping of bits (the number of bits in a set) is expanded, the total number of possible states is increased, and with it, the number of different symbols required, and the bit rate.

Stated somewhat differently, the recorded symbol rate for single track serial recording is normally limited by the bandwidth of the recorder, but by increasing the information content of each symbol, the information rate (or data rate, or packing density of the data) capable of being stored and read out on any given recorder-reproducer may be correspondingly increased. For example, if, for a particular recorder, the minimum pulse width that can be distinguished without interference from adjacent pulses is limited by the recorder bandwidth to 10 microseconds, then with conventional binary recording the recorded bit rate is limited to one bit per 10 microseconds, or 100 kilobits per second. By maintaining the same pulse width while allowing the pulses to have four possible levels, for example, rather than two as in the conventional binary case, two bits of information can be conveyed with each pulse (or pulse level). Since the pulse rate is not materially affected by the requirement of recognizing the additional levels, the recorded bit rate has been effectively increased from 100 kilobits per second in the immediately preceding example, to 200 kilobits per second.

As will be discussed in detail in the ensuing description of the preferred embodiments, the invention is not limited to use of multiple pulse levels (or simply, multiple signal amplitudes) as the symbols, but may alternatively employ symbols consisting of multiple phases or multiple frequencies, or for that matter any signal parameter capable of being modulated and recorded.

BRIEF DESCRIPTION OF THE DRAWINGS

The above and still further objects, features and advantages of my invention will become apparent from a consideration of the following detailed description of some preferred embodiments, especially when considered with the accompanying drawings, in which.

DESCRIPTION OF THE PREFERRED EMBODIMENTS

Figure 1:
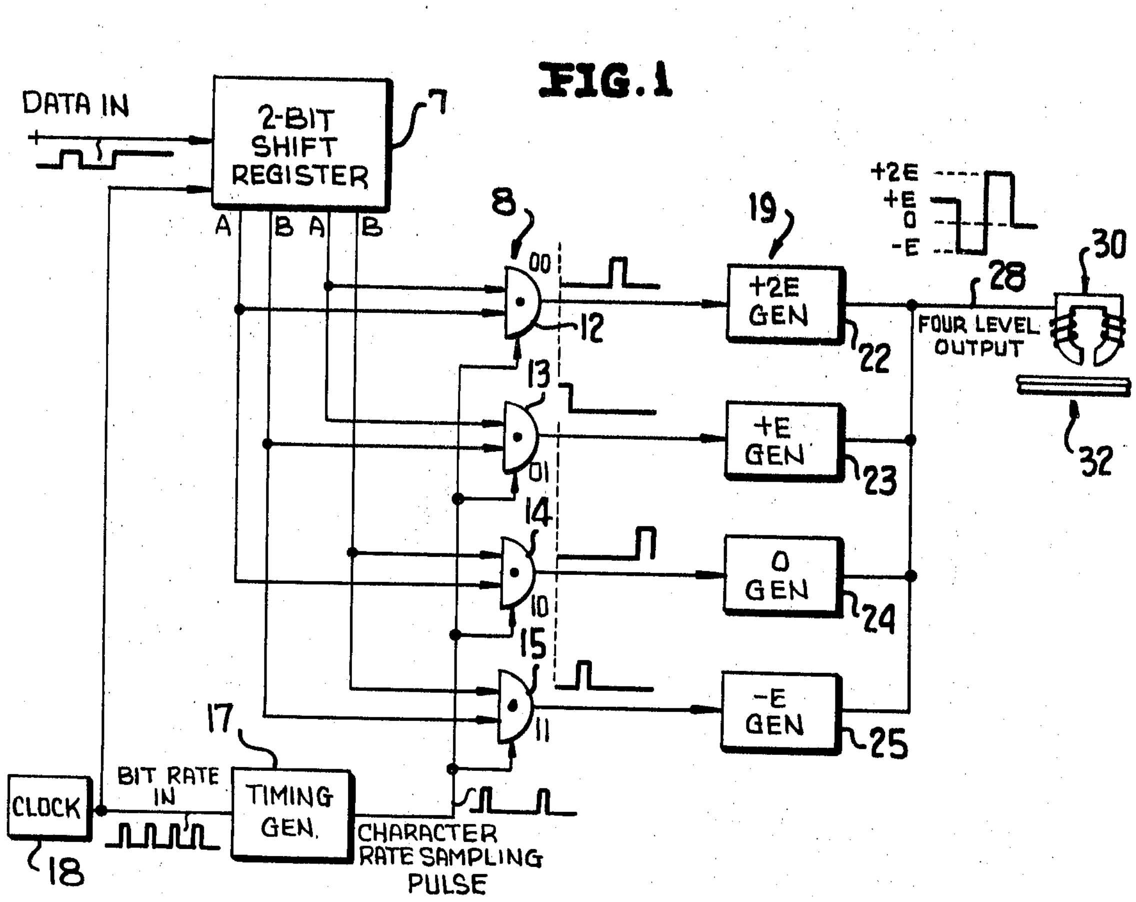
FIG. 1 is a circuit diagram of an embodiment employing multiple signal levels as the symbols to be recorded.

Referring now to FIG. 1, an embodiment of my invention providing multilevel modulation for recording of binary data includes a shift register 7 for accepting serial binary data containing the information to be recorded. The shift register is adapted to store the incoming data in groups or sets of two bits for application to a plurality of logical gate circuits 8. For this purpose, the shift register may be of conventional form, utilizing a pair of flip-flops each acting as a 1-bit storage cell to store whatever incoming bit was last synchronized with a clock pulse whose repetition frequency corresponds to the bit rate of the incoming data. The two flip-flops of the shift register are cascaded together so that the output of one becomes the input signal to the next. Upon application of a clock pulse (designated SHIFT at register 7 in FIG. 1) the second flip-flop takes on the state that the first flip-flop hand, and the first flip-flop is enabled to take on a new state (i.e., corresponding to the next successive bit in the incoming data).

In addition, each flip-flop stage of register 7 is provided with output leads for carrying a respective signal representative of its present state to succeeding decoding circuitry. In FIG. 1, these leads are designated A and B for each flip-flop stage. If the associated flip-flop is presently storing a bit of one value, a signal appears on the appropriate one of those leads, whereas if the present state of the flip-flop is a bit of the other value, a signal appears on the other of the two leads. For the sake of illustration in the succeeding description, the two possible bit values will be designated 0 and 1. Thus, for example, if the first flip-flop stage of the shift register is storing a 0, i.e., is in the 0 state, its A lead carries a pulse and its B lead is absent a pulse, and if the flip-flop is storing a 1, i.e., is in its 1 state, its A lead carries no signal and its B lead carries a pulse.

The A lead of the second flip-flop stage of register 7 is connected to one input terminal of each of gates 12 and 13, while the B lead of that stage is connected to a corresponding input terminal of each of gates 14 and 15. It will be understood, of course, that the last stage of the register carries the first bit of any given group or set of bits stored by the register (in terms of the sequence of bits in the incoming binary data), and that the first stage stores the last bit. For the first flip-flop stage, the A output lead is connected to the other input terminal of each of gates 12 and 14, and the B output lead is connected to the other input terminal of each of gates 13 and 15.

Each of gate circuits 12, 13, 14, and 15 is an AND gate (logical product circuit), capable of producing an output only in response to concurrent application of like inputs, and enabled to supply such output only on receipt of a sampling pulse from timing generator 17. With this arrangement and connections of decoding circuit 8 as shown in FIG. 1, if both flip-flops of register 7 are in the 0 state, pulses appear only on both of leads A and an output pulse (representing the 00 state of the overall shift register, i.e., both stored bits being 0's) is produced by gate 12 and only by gate 12. Similarly, the other three possible bit combinations or states of register 7 results in an output pulse from a distinct and different gate for each state, and only from that respective gate.

Timing generator 17 responds to the incoming clock pulses from a suitable clock pulse generator, these clock pulses having a rate corresponding to the bit rate of the serial binary data to be recorded, and are synchronized in timing therewith in any conventional manner. For purposes of sampling the decoding logic circuits 8, the timing generator is to supply a sampling pulse concurrently to those circuits at the time of occurence of every second bit of data in the serial binary stream, and may perform this function by simply eliminating the first pulse in every group of two pulses from the clock, permitting the second pulse to pass as the character (or symbol) rate sampling pulse. A simple divide-by-two circuit is suitable for use as timing generator 17, so long as each output pulse is synchronized with a respective one of the second pulses in the clock (bit rate) pulses.

The outputs of gates 8 are fed to respective ones of a plurality of character generators or symbol generators 19 as trigger pulses to cause the production of a predetermined output voltage level from the triggered generator. In essence, in the embodiment of FIG. 1, the distinct and different states of a set of bits are utilized to modulate the level of a voltage waveform in respective discrete steps, as a symbolic representation of each of those set states.

Generator 22 produces a constant voltage level of $+2E$ (where $E$ is any desired magnitude of voltage suitable for establishing a group of relative levels), and generators 23, 24, and 25 produce constant relative voltage levels of $+E$, $O$, and $-E$, respectively. However, each voltage level appears on a respective output lead only when a trigger pulse is applied to the input lead for that generator. In practice, the entire group of generators 19 may be implemented by a potentiometer having a precise, substantially invariant voltage supply, and having a plurality (here, four) of equally spaced taps each connected to a respective normally nonconducting switch (e.g., a transistor capable of high speed switching) arranged to respond to a pulse from a respective one of gating circuits 8 to conductively connect the associated tap to an appropriate one of the output leads. Preferably, the trigger pulses or keying pulses of gates 8 are equal in length to a bit in the incoming binary data to ensure that the generated symbols (voltage levels) have the same packing density as a like number of bits.

The output leads of voltage generators 19 are connected together for sequential application of their output voltage levels to a suitable conventional magnetic tape recording system. For the sake of simplicity, the common output lead 28 is shown connected to the record winding of a recording head 30 operatively associated with magnetic tape 32 for recording of the symbols or characters representing states of each incoming set or group of bits in the serial binary data, in the form of voltage levels on the tape.

In operation of the system of FIG. 1, each group of two bits in sequence in the serial binary data stream is fed into and stored in the shift register 7 in response to two successive shift pulses (at the bit rate) applied to the register. Coincident with the second shift pulse, and hence with the insertion of the second bit of the set in the register, a sampling pulse from timing generator 17 is applied concurrently to each of logic gate circuits 12, 13, 14, and 15. Depending upon which one of the four possible states of a group of two bits the register has stored therein at the moment of the sampling pulse, one and only one of the gate circuits 8 will be enabled to supply an output pulse for keying the associated one of the voltage generators 19.

Accordingly, each possible state of the group of bits in the shift register (or simply, each possible state of the shift register) modulates the selected parameter of an electrical signal, here the level of a voltage, to produce one of a plurality of possible coded symbols or characters (parameter variations) equal in number to the number of possible shift register states. In the present example, if the first set of bits has the values 01, the second 11, the third 00, and the fourth 10, then the gating circuits 8 supply pulse outputs in the gate sequence 13, 15, 12, 14, and the voltage levels are keyed in the sequence $+E$, $-E$, $+2E$, $O$, as shown in the multilevel output waveform 33 of FIG. 1. These levels, which constitute the symbols or characters of the code representing multiple bit sets, are recorded in that sequence on magnetic tape 32, or on any other suitable recording medium.

Obviously, this basic system may be extended to provide a larger number of output levels to accommodate a larger set of bits (with a larger number of possible states), by increasing the number of shift register stages, gating circuits (or logic decoding circuits), and voltage level generators.

Figure 2:
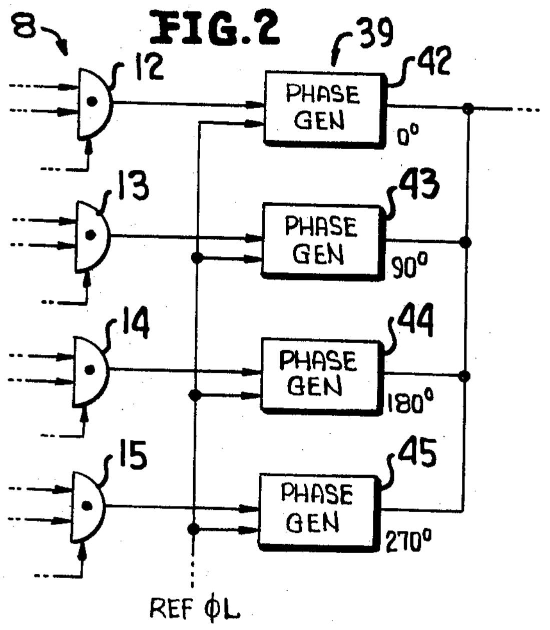
FIG. 2 is a partial circuit diagram of a second embodiment, employing multiple phases relative to a reference phase angle as the symbols.

In a second embodiment of the invention, shown in pertinent part in FIG. 2, the voltage level generators are replaced by phase generators 39 to provide a multiphase modulation system. In the embodiment of FIG. 2, the sequential outputs of gates 8 key respective ones of the phase generators 39 to produce appropriately phased outputs which constitute the symbols representing particular states of the shift register. Each of the phase generators produces an output signal having a preselected phase displacement (which may include 0°, for present purposes) relative to a reference phase angle or reference signal. For example, generator 42 supplies an output, when keyed, having a relative phase of 0°, generator 43 a relative phase of 90°, generator 44 a relative phase of 180°, and generator 45 a relative phase of 270°.

Figure 3:
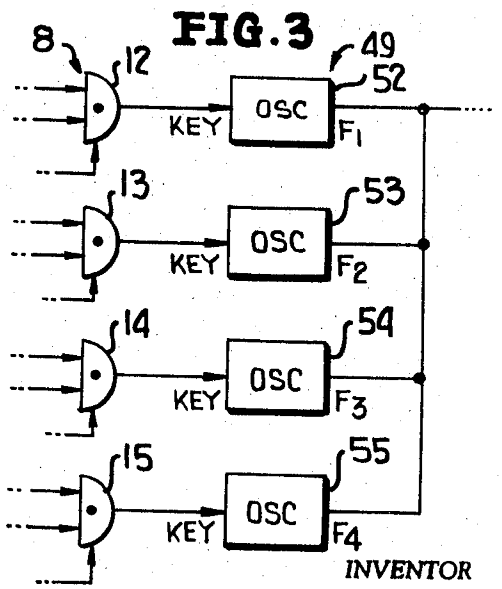
FIG. 3 is a partial circuit diagram of a third embodiment, employing multiple frequencies as the symbols.

In a third embodiment of my invention, shown in pertinent part in FIG. 3, the character generators are keyed oscillators 49, connected to receive output pulses of respective gating circuits 8, to produce respective outputs of distinct and different frequencies as the symbols to be recorded. In the system of FIG. 3, when oscillator 52 is keyed by an output pulse from gate 12, it supplies an output signal of frequency $F_1$ on its output lead. Similarly, oscillators 53, 54, and 55 produce respective signals of frequencies $F_2$, $F_3$, and $F_4$ when keyed by output pulses of respective ones of gates 8.

As in the case of the voltage level coder embodiment, both the phase coder of FIG. 2 and the frequency coder of FIG. 3 can be extended to provide more than four symbols, by the use of straightforward techniques following the teaching presented herein.

I claim:

1. Apparatus for recording information contained in a serial binary data input, comprising:

means including a step storage register for dividing said binary data into successive groups each of more than one bit in the order contained in said input, each group containing a like number of bits;

means for sampling said groups in sequence by parallel readout of said register and responsive to each group sampled to produce a distinct and different coded symbol of always the same duration and time position for each diverse group, wherein said coded symbols each occupies no more than the same duration as that occupied by a bit in said binary data input, and wherein the coded symbols are uniquely representative each of a different one of the diverse groups; and means responsive to said coded symbols for recording said symbols on a recording medium in the sequence produced by said means for sampling as a representation of the original binary data input in compacted form.

2. The invention according to claim 1 wherein said sampling and producing means includes voltage generating means responsive to each group of bits in the sequence sampled to generate a voltage having a respective level characterizing the sequence of bit values in that particular group, the voltage levels generated by said voltage generating means constituting said coded symbols.

3. The invention according to claim 1 wherein said sampling and producing means includes phase generating means responsive to each group of bits in the sequence sampled to generate a signal having a respective phase, relative to a preselected reference signal, characterizing the sequence of bit values in that particular group, the phases of the signals generated by said phase generating means, relative to said preselected reference level, constituting said coded symbols.

4. The invention according to claim 1 wherein said sampling and producing means includes oscillator means responsive to each group of bits in the sequence sampled to generate a signal having a respective frequency characterizing the sequence of bit values in that particular group, the frequencies of the signals generated by said oscillator means constituting said coded symbols.

5. In a process for recording the information content of an incoming serial binary data stream:

dividing said binary data into successively occurring groups in a multistage step register, each group consisting of more than one bit taken in the order received, with all groups containing like numbers of bits;

sampling said groups in sequence by reading out all the stages of said register in parallel and assigning to each sampled group a coded symbol uniquely representative of the sequence of bit values in that group at such times in the data stream that the coded symbol for any group occupies a time block no greater than equal to that occupied by a bit at the bit rate of the incoming binary data; and recording the coded symbols on a recording medium in the sequence in which they are sampled as a representation of the incoming binary data in a compacted form.

6. Apparatus for recording serial binary data, comprising:

multistage step register means for separating the data into sets each consisting of a plurality of bits, each set containing a like number of bits and the bits in each set and the sets themselves maintaining the bit sequence of the original stream of serial binary data such that each set has a plurality of possible characters respectively designating the plurality of possible unique sequences of bit values therein;

signal generator means for producing a signal having a variable parameter subsisting for no more than the time of one bit;

means responsive to the characters of each of said sets in the sequence of sets into which said binary data has been separated for sequentially modulating said variable parameter according to the respective characters of the sets to provide distinct and different ones of said parameters for each distinct and different character and thereby a modulated output signal; and means responsive to the modulated output signal for recording said output signal on a magnetic recording medium, the length of the modulation interval representing each character in the signal being no longer than the time interval occupied by each bit in the original stream of serial binary data, whereby to record the entire information content of said original data in compacted form.

7. The invention according to claim 6 wherein said signal generator is a voltage generator, and said variable parameter is the level of said voltage.

8. The invention according to claim 6 wherein said signal generator is a phase generator, and said variable parameter is the phase of the generated signal relative to a reference signal.

9. The invention according to claim 6 wherein said signal generator is an oscillator, and said variable parameter is the frequency of the signal produced by said oscillator.

10. In a serial binary data recording system, shift register means for storing a plurality of bits of said binary data in the sequence received; $2^n$ logic circuits, where $n$ is the number of bits said shift register is capable of storing, each of said logic circuits for detecting one and only one of the $2^n$ possible states of said shift register, so that each distinct state is detected by a different logic circuit, each state representing a respective sequence of values of the bits stored in said register; $2^n$ signal generating means, each for generating a signal of the same type having a parameter whose value differs from the value of the same parameter of the signals generated by the other generating means, upon application of a keying pulse thereto; means responsive to the bit rate of said binary data for enabling said logic circuits every $n$th bit of said binary data to cause the logic circuit detecting the state of said register at that moment to supply a keying pulse to a respective one of said generating means; and means for sequentially recording the signals generated by all $2^n$ of said generating means.